United States Patent
Bae

(10) Patent No.: US 9,899,874 B2
(45) Date of Patent: Feb. 20, 2018

(54) ELECTRIC POWER SUPPLYING DEVICE, OF A WIRELESS ELECTRIC POWER TRANSMISSION APPARATUS AND METHOD FOR SUPPLYING ELECTRIC POWER

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 557 days.

(21) Appl. No.: 14/390,682

(22) PCT Filed: Apr. 1, 2013

(86) PCT No.: PCT/KR2013/002687
§ 371 (c)(1),
(2) Date: Oct. 3, 2014

(87) PCT Pub. No.: WO2013/151290
PCT Pub. Date: Oct. 10, 2013

(65) Prior Publication Data
US 2015/0102683 A1    Apr. 16, 2015

(30) Foreign Application Priority Data

Apr. 5, 2012  (KR) .................. 10-2012-0035668
Apr. 6, 2012  (KR) .................. 10-2012-0036087

(51) Int. Cl.
*H02J 17/00*    (2006.01)
*H02J 3/01*     (2006.01)

(52) U.S. Cl.
CPC .............. *H02J 17/00* (2013.01); *H02J 3/01* (2013.01)

(58) Field of Classification Search
None
See application file for complete search history.

(56) References Cited

U.S. PATENT DOCUMENTS

| 6,160,374 A * | 12/2000 | Hayes | H02J 7/025 320/108 |
| 6,825,620 B2 * | 11/2004 | Kuennen | A61L 2/10 315/224 |
| 2004/0130915 A1 * | 7/2004 | Baarman | A61L 2/10 363/21.02 |
| 2005/0135129 A1 | 6/2005 | Kazutoshi | |

(Continued)

FOREIGN PATENT DOCUMENTS

| JP | 05-207606 A | 8/1993 |
| JP | 10-201144 A | 7/1998 |

(Continued)

*Primary Examiner* — Jared Fureman
*Assistant Examiner* — James Evans
(74) *Attorney, Agent, or Firm* — Birch, Stewart, Kolasch & Birch, LLP

(57) ABSTRACT

A power supply device for a wireless power transmitting apparatus according to an embodiment of the present invention includes a power supply unit to supply DC power, an AC power generating unit to generate AC power by using the DC power, and a harmonic component reduction unit to reduce a magnitude of power for a harmonic frequency component in the generated AC power.

9 Claims, 10 Drawing Sheets

(56) References Cited

U.S. PATENT DOCUMENTS

| | | | | |
|---|---|---|---|---|
| 2010/0033156 A1* | 2/2010 | Abe | ............... | H02M 3/3378 |
| | | | | 323/305 |
| 2011/0109263 A1 | 5/2011 | Sakoda et al. | | |
| 2011/0241440 A1* | 10/2011 | Sakoda | ............... | H02J 5/005 |
| | | | | 307/104 |
| 2013/0049674 A1* | 2/2013 | Davis | ............... | B60L 11/182 |
| | | | | 320/101 |
| 2013/0119773 A1* | 5/2013 | Davis | ............... | H02J 5/005 |
| | | | | 307/104 |

FOREIGN PATENT DOCUMENTS

| | | |
|---|---|---|
| JP | 2004-080844 A | 3/2004 |
| KR | 10-2005-0054816 A | 6/2005 |
| KR | 10-2011-0051144 A | 5/2011 |

* cited by examiner

ELECTRIC POWER SUPPLYING DEVICE, OF A WIRELESS ELECTRIC POWER TRANSMISSION APPARATUS AND METHOD FOR SUPPLYING ELECTRIC POWER

TECHNICAL FIELD

The present invention relates to a wireless power transmitting technology. More particularly, the present invention relates to a wireless power transmitting technology, capable of maximizing power transmission efficiency through resonance or electromagnetic induction.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been attempted. Some electric toothbrushes or wireless razors, which are usually used, are actually charged with electricity through an electromagnetic induction principle. The electromagnetic induction refers to a phenomenon in which a voltage is induced so that a current flows when a magnetic field is varied around a conductor. Although the commercialization of the electromagnetic induction technology has been rapidly progressed around small-size devices, the power transmission distance thereof is short.

Until now, the long-distance transmission using the electromagnetic induction, the resonance and the short-wavelength radio frequency has been used as the wireless energy transfer scheme.

Recently, an energy transfer scheme has been extensively used based on an electromagnetic induction or resonance scheme among wireless power transmission schemes.

Since a wireless power transmission system based on the electromagnetic induction scheme and the resonance scheme wirelessly transmits electrical signals generated from a transmitter and a receiver through a coil, a user can easily charge an electronic device such as a portable device with electricity.

However, the power transmission efficiency of the wireless power transmission system may be degraded due to an unnecessary frequency component of AC power supplied to a conventional wireless power transmitting apparatus.

SUMMARY OF THE INVENTION

An object of the present invention is to provide a method of maximizing power transmission efficiency by reducing power loss occurring when DC power is converted into AC power.

Another object of the present invention is to provide a method of enhancing power transmission efficiency by reducing power having a harmonic frequency component in AC power transmitted from a power supply device to a wireless power transmitting apparatus.

Still another object of the present invention is to provide a method of maximizing the power transmission efficiency in an electromagnetic induction-type or a resonance-type wireless power transmission system.

According to the embodiment of the present invention, there is a power supply device including a power supply unit to supply DC power, an AC power generating unit to generate AC power by using the DC power, and a harmonic component reduction unit to reduce a magnitude of power for a harmonic frequency component in the generated AC power.

According to another embodiment of the present invention, there is provided a power supply method of a power supply device to supply power to a wireless power transmitting apparatus. The power supply method includes supplying DC power, outputting AC power using the DC power, and reducing a magnitude of power for a harmonic frequency component in the output AC power.

According to the embodiment of the present invention, the power consumption preventing unit is provided in the wireless power transmission system, thereby reducing power loss occurring when DC power is converted into AC power to maximize power transmission efficiency.

In addition, the power transmission efficiency can be enhanced by reducing power having the harmonic frequency component in AC power transmitted from the power supply device to the wireless power transmitting apparatus.

Meanwhile, other effects will be directly or indirectly disclosed in the detailed description of the embodiments of the present invention to be described.

DETAILED DESCRIPTION OF THE EMBODIMENTS

Hereinafter, an exemplary embodiment of the present invention will be described in detail with reference to accompanying drawings so that those skilled in the art can easily conduct the present invention.

Figure 1:
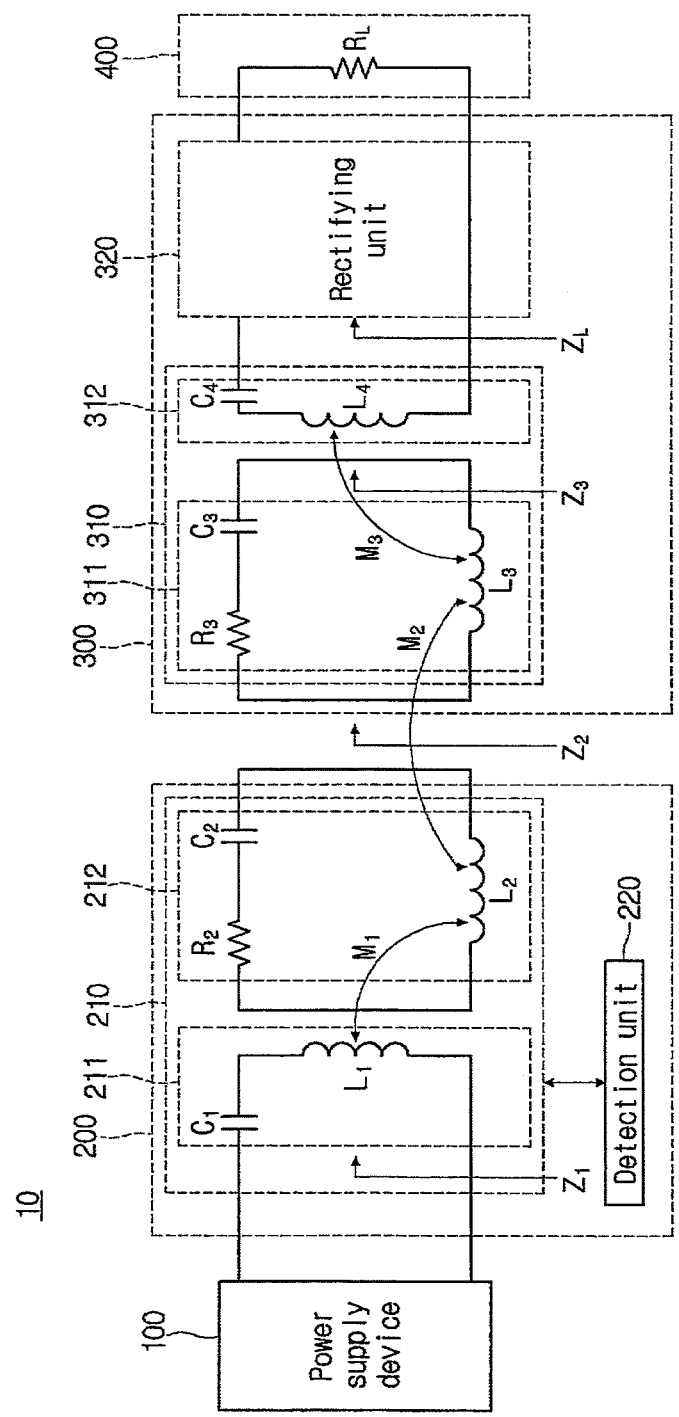
FIG. 1 is a block diagram showing a power supply device 100 according to one embodiment of the present invention.
Figure 2:
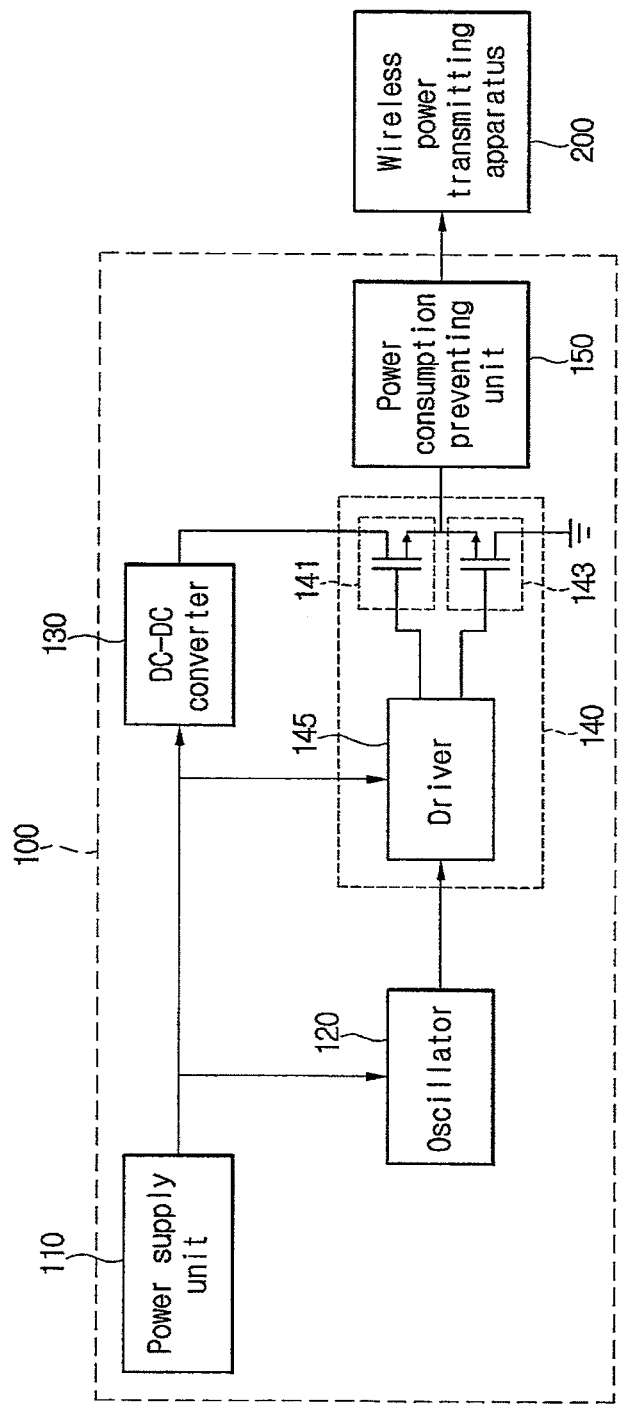
FIG. 2 is a circuit diagram showing the structure of a resonance-type wireless power transmission system 10 in the power supply device 100 according to a first embodiment of the present invention.

FIG. 1 is a block diagram showing the structure of a power supply device 100 according to a first embodiment of the present invention, and FIG. 2 is a circuit diagram showing a wireless power transmission system 10 according to the first embodiment of the present invention.

Referring to FIG. 1, the power supply device 100 may include a power supply unit 110, an oscillator 120, a DC-DC converter 130, an AC power generating unit 140, and a power consumption preventing unit 150.

According to one embodiment, if the wireless power transmitting apparatus 200 transmits power to a wireless power receiving apparatus 300 through resonance, the wireless power transmitting apparatus 200 may include a transmission induction coil unit 211 and a transmission resonant coil unit 212 as shown in FIG. 2. If the wireless power transmitting apparatus 200 transmits power to a wireless power receiving apparatus 300 through electromagnetic induction, the wireless power transmitting apparatus 200 may not include the transmission resonant coil unit 112.

The power supply unit 110 may supply DC power to components of the power supply device 100.

The oscillator 120 may generate an AC power signal having a predetermined frequency to be transmitted to the AC power generating unit 140.

In particular, the oscillator 120 may generate an AC power signal having a frequency used for power transmission between the wireless power transmitting apparatus 200 and the wireless power receiving apparatus 300, which will be described later, and transmit the AC power signal to the AC power generating unit 140. According to one embodiment, if the wireless power transmitting apparatus 200 transmits power to the wireless power receiving apparatus 300 through resonance, the frequency used for the power transmission may be a resonance frequency.

The DC-DC converter 130 converts DC voltage supplied from the power supply unit 110 into DC voltage having a predetermined voltage value to be output.

After converting the DC voltage output from the power supply unit 110 into AC voltage, the DC-DC converter 130 may boost up or drop down and rectify the AC voltage to generate the DC voltage having the predetermined voltage value.

The DC-DC converter 130 may include a switching regulator or a linear regulator.

The linear regular is a converter to receive an input voltage, to output an output voltage by a necessary quantity, and to radiate remaining voltage in the form of heat.

The switching regulator is a converter capable of adjusting the output voltage through a pulse width modulation (PWM) scheme.

The AC power generating unit 140 may convert DC power received from the DC-DC converter 130 into AC power by using an AC power signal received from the oscillator 120.

The AC power generating unit 140 may include a push-pull type dual MOSFET.

If the AC power generating unit 140 includes the push-pull type dual MOSFET, the AC power generating unit 140 may include a first MOSFET 141, a second MOSFET 143, and a driver 145.

The driver 145 may receive the AC power signal having a predetermined frequency from the oscillator 120. According to one embodiment, the AC power signal may have a rectangular waveform.

The driver 145 may further include an amplification buffer (not shown) to amplify the AC power signal received from the oscillator 120 and transmit the AC power signal to the first and second MOSFET 141 and 143.

The driver 145 may apply AC power signals having the same magnitude and opposite phases to the first and second MOSFETs 141 and 143, respectively. As the AC power signals having opposite phases are applied to the first and second MOSFETs 141 and 143, respectively, if the first MOSFET 141 is turned on, and the second MOSFET 143 is turned off. If the first MOSFET 141 is turned off, the second MOSFET is turned on.

If the first MOSFET 141 is turned on, and the second MOSFET 143 is turned off, an AC current is applied to the wireless power transmitting apparatus 200 through the first MOSFET 141. To the contrary, if the first MOSFET 141 is turned off and the second MOSFET 143 is turned on, AC current flows from the wireless power transmitting apparatus 200 to the ground through the second MOSFET 143.

Since the AC current flows among the first and second MOSFETs 141 and 143 and the wireless power transmitting apparatus 200 as if the AC current is pushed or pulled, the AC power generating unit 140 may be described in a push pull type structure.

The AC power signal having the rectangular waveform applied to the wireless power transmitting apparatus 200 may include a fundamental frequency component and a harmonic frequency component.

The fundamental frequency component refers to a frequency component of a basic wave among frequency components of the AC power signal having the rectangular waveform applied to the wireless power transmitting apparatus 200. In general, the fundamental wave refers to a wave without distortion.

The harmonic frequency component refers to an integer times the fundamental frequency.

Although the fundamental frequency may be 300 kHz according to one embodiment, the fundamental frequency of 300 kHz is provided for the illustrative purpose.

If the fundamental frequency 300 kHz, the harmonic frequency becomes 600 kHz, 900 kHz, 1200 kHz, 1500 kHz, 1800 kHz, and 2100 kHz which are integer times the fundamental frequency of 300 kHz.

In power transmission, the fundamental component of the AC power is actually transmitted, and the harmonic component of the AC power is unnecessary. Therefore, the harmonic component may serve as one factor to cause power loss in terms of power transmission efficiency.

The power consumption preventing unit 150 may reduce the magnitude of power for the harmonic frequency component by increasing an input impedance against the harmonic frequency component of the converted AC power.

If the input impedance against the harmonic frequency component is increased, the magnitude of the power consumed due to the harmonic frequency may be reduced since power is inversely proportional to the magnitude of the input impedance.

The power consumption preventing unit 150 increases the input impedance against the harmonic frequency component of the AC power converted in the AC power generating unit 140 to prevent unnecessary power generated due to the harmonic frequency component from being transmitted to the wireless power transmitting apparatus 200, thereby preventing unnecessary power consumption.

According to one embodiment, the power consumption preventing unit 150 includes an inductor.

The increase of the input impedance of the wireless power transmission system by the power consumption preventing unit 150 will be described in detail with reference to FIG. 5.

FIG. 2 is a circuit diagram showing the structure of the wireless power transmission system 10 according to a first embodiment of the present invention.

In particular, FIG. 2 shows the structure of the wireless power transmission system 10 using the power supply device 100 having no power consumption preventing unit 150 described with reference to FIG. 1.

Referring to FIG. 2, the wireless power transmission system 10 according to the first embodiment of the present invention may include the power supply device 100, the wireless power transmitting apparatus 200, the wireless power receiving apparatus 300, and a load 400.

The power supply device 100 supplies AC power to the wireless power transmitting apparatus 200, and the wireless power transmitting apparatus 200 may transmit the supplied AC power to the wireless power receiving apparatus 300 through resonance.

The wireless power transmitting apparatus 200 may transmit power to the wireless power receiving apparatus 300 through resonance occurring between coils which are mutually coupled to each other magnetically.

The power transmitted to the wireless power receiving apparatus 300 is transmitted to the load 400. The load 400 may refer to a rechargeable battery or other devices to require power. Load resistance at the load 400 is expressed as "RL" according to the embodiment of the present invention. According to one embodiment, the load 400 may be included in the wireless power receiving apparatus 300.

The power supply device 100 may include the power supply unit 110, the oscillator 120, the DC-DC converter 130, and the AC power generating unit 140, and the details thereof will be the same as that described with reference to FIG. 1.

The wireless power transmitting apparatus 200 may include a transmission coil unit 210 and a detection unit 220.

The transmission coil unit 210 wirelessly transmits AC power received from the power supply device 100 to the wireless power receiving apparatus 300.

The transmission coil unit 210 may include a transmission induction coil unit 211 and a transmission resonance coil unit 212.

The transmission induction coil unit 211 is connected to the power supply device 100, and AC current flows therethrough by the power received therein from the power supply device 100. When the AC current flows through the transmission induction coil unit 211, AC current is induced to the transmission resonance coil unit 212 physically spaced apart from the transmission induction coil unit 211 due to electromagnetic induction so that the AC current flows through the transmission resonance coil unit 212. The power received in the transmission resonance coil 212 is transmitted to the wireless power receiving apparatus 300, which forms a resonance circuit with the wireless power transmitting apparatus 200, by resonance.

Power may be transmitted between two LC circuits, which are impedance-matched with each other, by resonance. The power transmitted by the resonance can be farther transmitted with higher efficiency when comparing with the power transmitted by the electromagnetic induction.

The transmission induction coil unit 211 includes a transmission induction coil $L_1$ and a capacitor $C_1$. In this case, the capacitance of the capacitor $C_1$ is an adjusted value so that the capacitor $C_1$ makes resonance at a resonance frequency w.

One terminal of the capacitor $C_1$ is connected to one terminal of the power supply device 100, and the opposite terminal of the capacitor $C_1$ is connected to one terminal of the transmission induction coil $L_1$. The opposite terminal of the transmission induction coil $L_1$ is connected to the opposite terminal of the power supply device 100.

The transmission resonance coil unit 212 includes a transmission resonance coil $L_2$, a capacitor $C_2$, and a resistor $R_2$. The transmission resonance coil $L_2$ includes one terminal connected to one terminal of the capacitor $C_2$ and the opposite terminal connected to one terminal of the resistor $R_2$. The opposite terminal of the resistor $R_2$ is connected to the opposite terminal of the capacitor $C_2$. The resistance of the resistor R represents the quantity of power lost in the transmission resonance coil $L_2$. In this case, the capacitance of the capacitor $C_2$ is an adjusted value so that the capacitor $C_2$ makes resonance at a resonance frequency w.

The detecting unit 220 may measure a first input impedance $Z_1$. According to one embodiment, the first input impedance $Z_1$ is obtained when seen from the power supply device 100 toward the wireless power transmitting apparatus 200.

According to the embodiment, the detecting unit 220 may detect the first input impedance $Z_1$ by measuring current input to the wireless power transmitting apparatus 200. In detail, on the assumption that voltage input to the wireless power transmitting apparatus 200 is constant, the detecting unit 220 may detect the first input impedance $Z_1$ by measuring the current input to the wireless power transmitting apparatus 200.

The wireless power receiving apparatus 300 may include a reception coil unit 310 and a rectifying unit 320.

The wireless power receiving apparatus 300 may be embedded in an electronic device such as a cellular phone, a mouse, a laptop computer, and an MP3 player.

The receiving unit 310 includes a reception resonance coil unit 311 and a reception induction coil unit 312.

The reception resonance coil unit 311 includes a reception resonance coil $L_3$, a capacitor $C_3$, and a resistor $R_3$. The reception resonance coil $L_3$ includes one terminal connected to one terminal of the capacitor $C_3$ and the opposite terminal connected to one terminal of the resistor $R_3$. The opposite terminal of the resistor $R_3$ is connected to the opposite terminal of the capacitor $C_2$. The resistance of the resistor $R_3$ represents the quantity of power lost in the reception resonance coil $L_3$. In this case, the capacitance of the capacitor $C_3$ is adjusted by a controller 330 so that the capacitor $C_3$ makes resonance at a resonance frequency w.

The reception induction coil unit 312 may include a reception induction coil $L_4$ and a capacitor $C_4$. One terminal of the reception induction coil $L_4$ is connected to one terminal of the capacitor $C_4$, and the opposite terminal of the reception induction coil $L_4$ is connected to the opposite terminal of the rectifying unit 320. The opposite terminal of the capacitor $C_4$ is connected to one terminal of the rectifying unit 320. The capacitance of the capacitor $C_4$ is adjusted by the controller 330 so that the capacitor $C_4$ makes resonance at a resonance frequency w.

The reception resonance coil unit 311 maintains the resonance state with the transmission resonance coil unit 212 at the resonance frequency. In other words, the reception resonance coil unit 311 is coupled with the transmission resonance coil unit 212 such that an AC current flows through the reception resonance coil unit 311, and the wireless power receiving apparatus 300 may receive power from the wireless power transmitting apparatus 200 in a non-radiative scheme.

The reception induction coil unit 312 receives power from the reception resonance coil unit 311 by electromagnetic induction, and the power received in the reception induction coil unit 312 is transmitted to the load 400 after the power is rectified by the rectifier circuit 320.

The rectifying unit 320 receives the AC power from the reception induction coil unit 312 and rectifies the received AC power into DC power to be transmitted to the load 400.

The rectifying unit 320 may include a rectifying circuit (not shown) and a smoothing circuit (not shown).

The rectifying circuit may include a diode and a capacitor to convert the AC power received from the reception induction coil unit 312 into the DC power.

The smoothing circuit smoothes the output waveform of the converted DC power, and includes a capacitor.

The load 400 may include rechargeable batteries or devices to required DC power. For example, the load 400 may refer to a battery.

According to one embodiment, the load 400 may be included in the wireless power receiving apparatus 300.

Hereinafter, the power transmission efficiency and the variation in the input impedance according to the frequency of the wireless power transmission system 10 will be described with reference to FIGS. 3 and 4.

Figure 3:
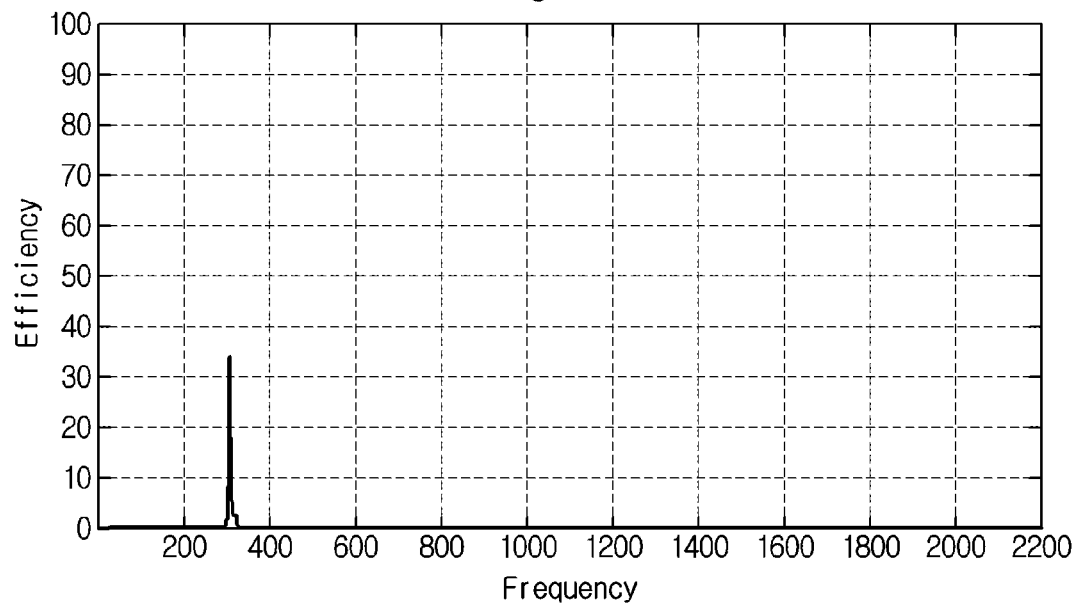
FIG. 3 is a graph to explain the variation of the power transmission efficiency as a function of the resonance-type wireless power transmission system 10 according to the first embodiment of the present invention.

FIG. 3 is a graph to explain the variation of the power transmission efficiency as a function of the wireless power transmission system 10 according to the first embodiment of the present invention. FIG. 4 is a graph to explain the variation of an input impedance as a function of a frequency of the wireless power transmission system 10 according to the first embodiment of the present invention.

Figure 4:
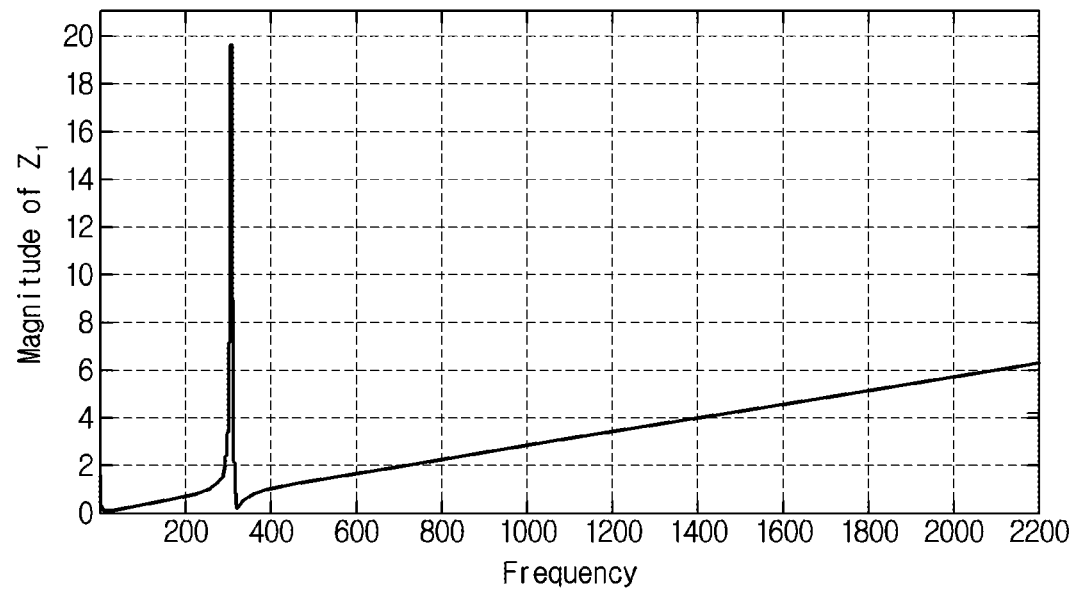
FIG. 4 is a graph to explain the variation of an input impedance as a function of a frequency of the resonance-type wireless power transmission system 10 according to the first embodiment of the present invention.

As shown in FIGS. 3 and 4, the fundamental frequency is assumed as 300 kHz, and the harmonic frequency is assumed as 600 kHz, 900 kHz, 1200 kHz, 1500 kHz, 1800 kHz, and 2100 kHz, which is integer times 300 kHz.

In addition, the fundamental frequency may refer to a frequency used for power transmission by resonance between the wireless power transmitting apparatus 200 and the wireless power receiving apparatus 300.

Referring to FIG. 3, a horizontal axis refers to a frequency (unit: kHz), and a vertical axis refers to power transmission efficiency. In this case, the power transmission efficiency may refer to power transmission efficiency between the wireless power transmitting apparatus 200 and the wireless power receiving apparatus 300. In other words, the power transmission efficiency may refer to the ratio of power received by the wireless power receiving apparatus 300 to power transmitted by the wireless power transmitting apparatus 200.

Referring to FIG. 4, the horizontal axis refers to a frequency (unit: kHz), and the vertical axis refers to an input impedance. In this case, the input impedance refers to impedance measured when the wireless power transmitting apparatus 200 is seen from the power supply device 100. The detection unit 220 may measure the input impedance.

Referring to FIGS. 3 and 4, higher power transmission efficiency and the higher magnitude of the input impedance can be represented at the fundamental frequency of 300 kHz as compared with harmonic frequencies of 600 kHz, 900 kHz, 1200 kHz, 1500 kHz, 1800 kHz, and 2100 kHz.

The low power transmission efficiency at the harmonic frequencies of 600 kHz, 900 kHz, 1200 kHz, 1500 kHz, 1800 kHz, and 2100 kHz refers to that power corresponding to the harmonic frequencies is not transmitted to the wireless power transmitting apparatus 200.

The low magnitude of the input impedance at the harmonic frequencies of 600 kHz, 900 kHz, 1200 kHz, 1500 kHz, 1800 kHz, and 2100 kHz refers to that the power corresponding to the harmonic frequencies is increased, so that unnecessary power consumption is caused.

Figure 5:
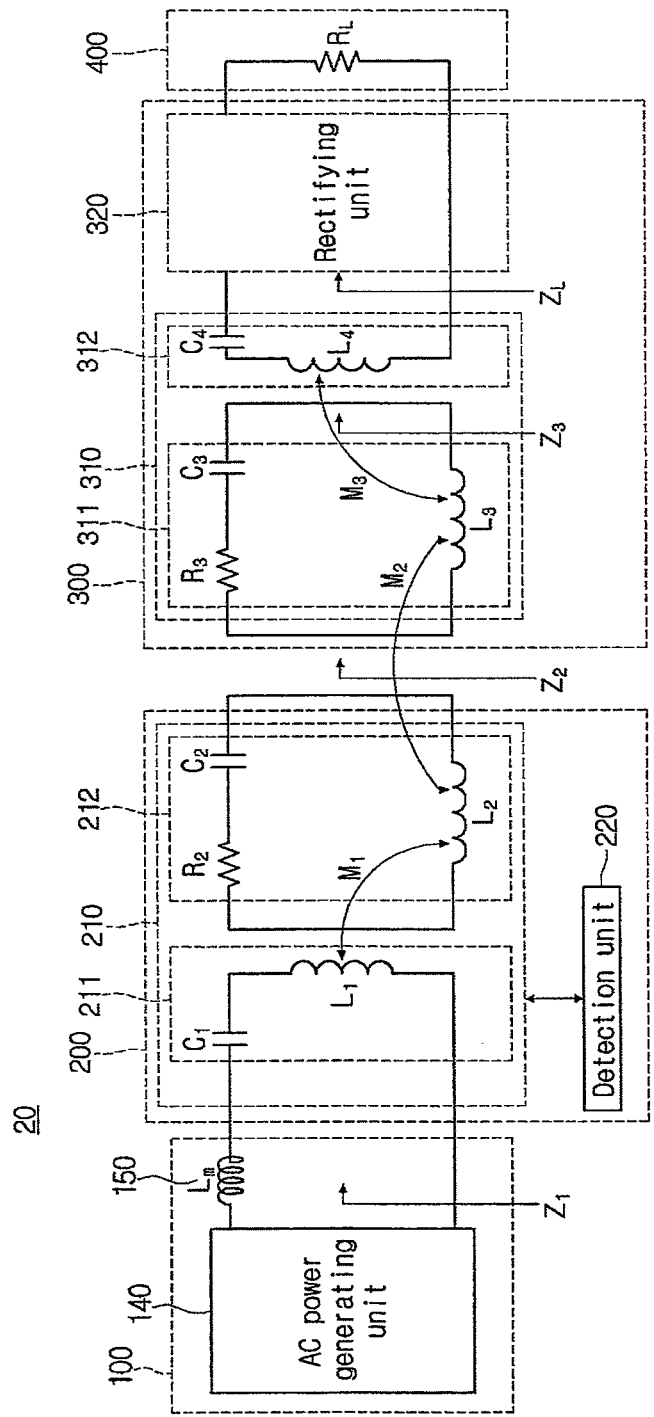
FIG. 5 is a circuit diagram showing a resonance-type wireless power transmission system according to a second embodiment of the present invention.

FIG. 5 is a circuit diagram showing the structure of the wireless power transmission system 20 according to a second embodiment of the present invention.

Particularly, FIG. 5 is a circuit diagram showing the structure of the wireless power transmission system 20 using the power supply device 100 including the power consumption preventing unit 150.

Referring to FIG. 5, the wireless power transmission system 20 may include the power supply device 100, the wireless power transmitting apparatus 200, the wireless power receiving apparatus 300, and the load 400.

Although FIG. 5 shows that the power supply device 100 includes only both of the AC power generating unit 140 and the power consumption preventing unit 150, the description of the power supply device 100 may have the same components as those described with reference to FIG. 1.

In addition, the description of the wireless power transmitting apparatus 200, the wireless power receiving apparatus 300, and the load 400 is the same as the description made with reference to FIG. 2. According to one embodiment, the power supply device 100 may include the wireless power transmitting apparatus 200.

The power consumption preventing unit 150 may reduce the magnitude of power for the harmonic frequency component by increasing the magnitude of an input impedance against the harmonic frequency component of the AC power converted in the AC power generating unit 140. If the input impedance against the harmonic frequency component is increased, the magnitude of the power consumed due to the harmonic frequency component may be reduced since the power is inversely proportional to the magnitude of the input impedance.

The power consumption preventing unit 150 increases the input impedance against the harmonic frequency component of the AC power generated from the AC power generating unit 140 to prevent unnecessary power, which is generated due to the harmonic frequency component, from being transmitted to the wireless power transmitting apparatus 200, thereby preventing unnecessary power consumption.

Hereinafter, details thereof will be described with reference to FIG. 5 by using an inductor Lm as the power consumption preventing unit 150.

The inductor Lm may be connected with the transmission induction coil unit 211 in series.

The AC power generating unit 140 of the power supply device 100 outputs AC power, and the output AC power includes a fundamental frequency component and a harmonic frequency component.

The inductor Lm can prevent power corresponding to the harmonic frequency component to the transmission coil unit 210. The power transmitted in the power transmission between the wireless power transmitting apparatus 200 and the wireless power receiving apparatus 300 is power corresponding to the fundamental frequency component, and the power corresponding the harmonic frequency component is unnecessary power that is not transmitted.

The inductor Lm prevents the power corresponding to the harmonic frequency component from being transmitted to the transmission coil unit 210 to increase the whole power transmission efficiency of the wireless power transmission system 20.

In detail, the inductor Lm may reduce power corresponding to the harmonic frequency component by increasing the input impedance against the harmonic frequency component. In addition, the inductor Lm may reduce power corresponding to the harmonic frequency component to increase the power transmission efficiency between the power supply device 100 and the wireless power transmitting apparatus 200, so that the whole power transmission efficiency of the wireless power transmissions system 20 can be increased.

Hereinafter, the increase of the input impedance (first input impedance) against the harmonic frequency component as the inductor Lm is added will be described.

A third input impedance $Z_3$ may refer to impedance measured when the load 400 is seen from the reception resonance coil unit 311 and expressed as Equation 1.

$$Z_3 = \frac{w^2 M_3^2}{Z_L + jwL_4 + \frac{1}{jwC_4}} \quad \text{Equation 1}$$

In this case, w denotes a resonance frequency when the transmission resonance coil $L_2$ makes resonance with the reception resonance coil $L_3$, and $M_3$ denotes a mutual inductance between the reception resonance coil $L_3$ and the reception induction coil $L_4$. Further, $Z_L$ denotes an output impedance.

Equation 1 is an equation based on a frequency domain, and even following equations are expressed based on the frequency domain.

The second input impedance $Z_2$ refers to an impedance measured when the wireless power receiving apparatus 300 is seen from the wireless power transmitting apparatus 200, and may be expressed as Equation 2:

$$Z_2 = \frac{jw^3 C_3 M_2^2}{1 - w^2 L_3 C_3 + jwC_3(Z_3 + R_3)} \quad \text{Equation 2}$$

In this case, $M_2$ denotes a mutual inductance between the transmission resonance coil $L_2$ and the reception resonance coil $L_3$, and $C_3$ denotes a capacitor expressed when the reception resonance coil unit 311 is transformed. In addition, the resistance of the resistor $R_3$ represents the quantity of power lost in the reception resonance coil $L_3$.

While the capacitor $C_3$ and the leakage resistor $R_3$ may have constant values, the mutual inductance $M_2$ may be varied with a coupling coefficient $K_2$ between the transmission resonance coil $L_2$ and the reception resonance coil $L_3$.

The coupling coefficient K2 represents a degree of the electromagnetic coupling between the transmission resonance coil L2 and the reception resonance coil L3, and may be varied by at least one of a distance, a direction and a position between the wireless power transmitting apparatus 200 and the wireless power receiving apparatus 300 in the wireless power system.

The first input impedance $Z_1$ is an impedance measured when the wireless power transmitting apparatus 200 is seen from the power supply device 100 and may be expressed as Equation 3:

$$Z_1 = jwL_m + jwL_1 + \frac{1}{jwC_1} + \frac{jw^3 C_2 M_1^2}{1 - w^2 L_2 C_2 + jwC_2(Z_2 + R_2)} \quad \text{Equation 3}$$

In this case, M1 represents a mutual inductance between the transmission induction coil $L_1$ and the transmission resonance coil $L_2$.

If the third input impedance $Z_3$ of Equation 1 is substituted into Equation 2, and the second input impedance $Z_2$ resulting from the substitution is substituted into Equation 3, the first input impedance $Z_1$ may be expressed in an equation without a variable $Z_2$ for the second input impedance and a variable $Z_3$ for the third input impedance. In this case, if all variables constituting the equation related to the first input impedance $Z_1$ have constant values, the first input impedance $Z_1$ may be measured based on the constant values of the all variables.

According to another embodiment, the detection unit 220 may detect the first input impedance by measuring input current input to the wireless power transmitting apparatus 200 if input voltage of the wireless power transmitting apparatus 200 is constant.

The first input impedance for the harmonic frequency component may be varied according to the inductance of the inductor Lm constituting the power consumption preventing unit 150. In detail, as shown in Equation 3, if the inductance of the inductor Lm is increased, the magnitude of the first input impedance $Z_1$ may be significantly increased.

Meanwhile, as shown in FIG. 2, if the inductor Lm is not included, the first input impedance Z1 must be found by removing the item of jwLm from Equation 3.

In addition, the first input impedance for the harmonic frequency component may be varied depending on the frequencies of the first input impedance. In detail, the first input impedance for the harmonic frequency component may be increased as the multiple of the fundamental frequency is increased, which will be described later.

In addition, if the fundamental frequency (resonance frequency) is w1, and the values of the reception resonance coil $L_3$ and the capacitor $C_3$, and the reception induction coil $L_4$ and the capacitor $C_4$ are set in such a manner that the resonance frequencies between the reception resonance coil $L_3$ and the capacitor $C_3$, and between the reception induction coil $L_4$ and the capacitor $C_4$ are w1, the fundamental frequency may be expressed as Equation 4.

$$w_1 = \frac{1}{\sqrt{L_3 C_3}} = \frac{1}{\sqrt{L_4 C_4}} \quad \text{Equation 4}$$

Each harmonic frequency may be expressed as those in Equations 5 to 7.

Equation 5 represents a harmonic frequency corresponding to twice greater than the fundamental frequency.

$$w_2 = 2w_1 = \frac{2}{\sqrt{L_3 C_3}} = \frac{2}{\sqrt{L_4 C_4}} \quad \text{Equation 5}$$

Equation 6 represents a harmonic frequency corresponding to three times greater than the fundamental frequency.

$$w_3 = 3w_1 = \frac{3}{\sqrt{L_3 C_3}} = \frac{3}{\sqrt{L_4 C_4}} \quad \text{Equation 6}$$

Equation 7 represents a harmonic frequency corresponding to four times greater than the fundamental frequency.

$$w_4 = 4w_1 = \frac{4}{\sqrt{L_3 C_3}} = \frac{4}{\sqrt{L_4 C_4}} \qquad \text{Equation 7}$$

The input impedance for each harmonic frequency component may be obtained by substituting variables w2, w3, and w4 of Equations 5 to 7 into a variable w of Equation 4.

Hereinafter, the variation in the power transmission efficiency and the input impedance as a frequency of the wireless power transmission system 20 according to a second embodiment of the present invention, which has been described with reference to FIG. 5, will be described with reference to FIGS. 6 and 7.

Figure 6:
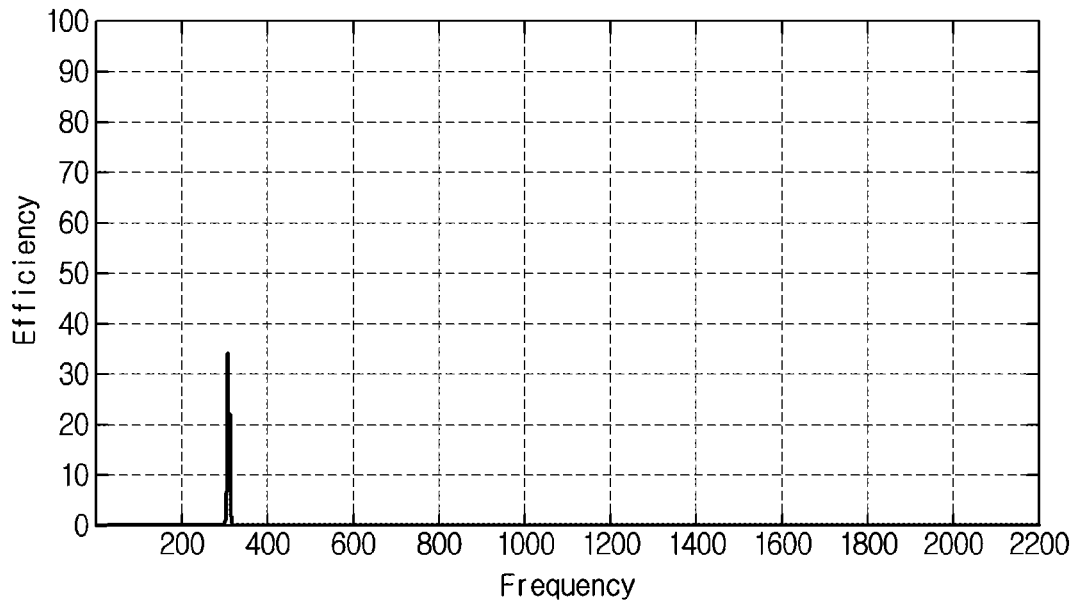
FIG. 6 is a graph to explain the variation of the power transmission efficiency as a function of the resonance-type wireless power transmission system 20 according to the second embodiment of the present invention.
Figure 7:
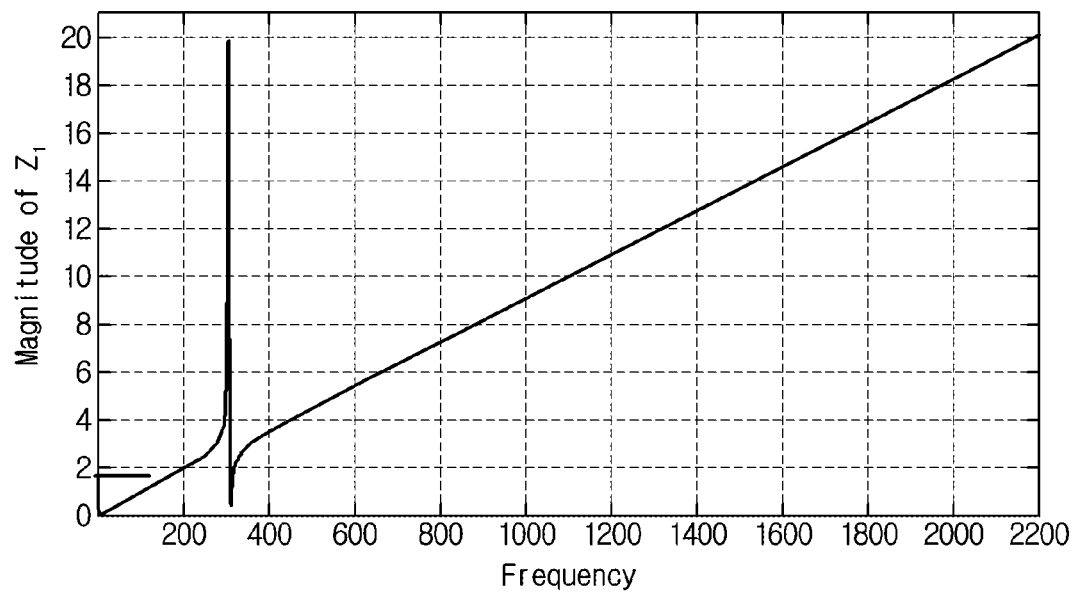
FIG. 7 is a graph to explain the variation of an input impedance as a function of a frequency of the resonance-type wireless power transmission system 20 according to the second embodiment of the present invention.

FIG. 6 is a graph to explain the variation in the power transmission efficiency as a function of the wireless power transmission system 20 according to the second embodiment of the present invention, and FIG. 7 is a graph to explain the variation in the input impedance as a function of the wireless power transmission system 20 according to the second embodiment of the present invention.

The fundamental frequency is 300 kHz, and the harmonic frequency is 600 kHz, 900 kHz, 1200 kHz, 1500 kHz, 1800 kHz, or 2100 kHz, which is integer times 300 kHz.

In addition, the fundamental frequency may refer to a frequency used to transmit power between the wireless power transmitting apparatus 200 and the wireless power receiving apparatus 300 due to resonance.

Referring to FIG. 6, a horizontal axis refers to a frequency (unit: kHz), and a vertical axis refers to power transmission efficiency. In this case, the power transmission efficiency may refer to power transmission efficiency between the wireless power transmitting apparatus 200 and the wireless power receiving apparatus 300. In other words, the power transmission efficiency may refer to the ratio of power received by the wireless power receiving apparatus 300 to power transmitted by the wireless power transmitting apparatus 200.

Referring to FIG. 7, a horizontal axis refers to a frequency (unit: kHz), and a vertical axis refers to an input impedance Z1. In this case, the input impedance refers to impedance measured when the wireless power transmitting apparatus 200 is seen from the power supply device 100.

When FIG. 3 is compared with FIG. 6, the variation in the power transmission efficiency (about 35%) between the wireless power transmitting apparatus 200 and the wireless power receiving apparatus 300 at the fundamental frequency of 300 kHz is hardly represented.

When FIG. 4 is compared with FIG. 7, the magnitude of the input impedance is increased by about 0.5Ω at the fundamental frequency of 300 kHz, by about 3.5Ω at the harmonic frequency of 600 kHz, by about 5.5Ω at the harmonic frequency of 900 kHz, by about 8Ω at the harmonic frequency of 1200 kHz, by about 10Ω at the harmonic frequency of 1500 kHz, by about 11.5Ω at the harmonic frequency of 1800 kHz, and by about 13Ω at the harmonic frequency of 2100 kHz, In other words, when an inductor Lm serving as the power consumption preventing unit 150 is connected to the transmission induction coil unit 211, the variation in the power transmission efficiency between the wireless power transmitting apparatus 200 and the wireless power receiving apparatus 300 is hardly represented, but the power for the harmonic frequency component is not consumed by increasing the input impedance at the harmonic frequency Therefore, the power transmission efficiency between the power supply device 100 and the wireless power transmitting apparatus 200 is improved due to the connection with the inductor Lm, so that the whole power transmission efficiency of the wireless power transmission system 20 can be improved.

Figure 8:
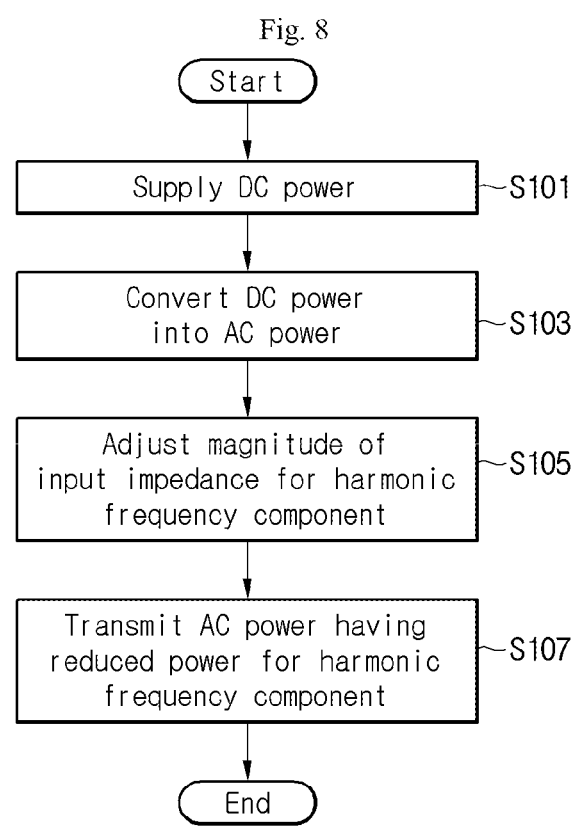
FIG. 8 is a flowchart to explain a method of supply power of the power supply device according to one embodiment of the present invention.

FIG. 8 is a flowchart to explain a power supply method of the power supply device according to one embodiment of the present invention.

The power supply device 100 has the same configuration as that described with reference to FIG. 1.

Referring to FIG. 8, the power supply unit 110 supplies DC power to each component of the power supply device 100 (S101).

Thereafter, the DC-DC converter 130 converts a predetermined voltage value into DC voltage value to be output using the DC power supplied from the power supply unit 110. The DC-DC converter 130 converts the DC voltage applied from the power supply unit 110 into AC voltage, and then boosts up or drops down and rectifies the converted AC voltage to output DC voltage having a predetermined voltage value.

Then, the AC power generating unit 140 may convert the DC power received from the DC-DC converter 130 into AC power (S103).

The AC power generating unit 140 may convert the DC power received from the DC-DC converter 130 into AC power by using an AC power signal received from the oscillator 120.

The AC power generating unit 140 may include a push-pull type of dual MOSFETs.

Thereafter, the power consumption preventing unit 150 adjusts the magnitude of the input impedance for the harmonic frequency component in the converted AC power (S105). In other words, the power consumption preventing unit 150 may reduce the magnitude of the power consumed by the harmonic frequency component by increasing the magnitude of the input impedance for the harmonic frequency component in the converted AC power.

Accordingly, the power consumption preventing unit 150 may prevent power consumption by preventing unnecessary power, which is generated due to the harmonic frequency component, from being transmitted to the wireless power transmitting apparatus 200.

Thereafter, the power consumption preventing unit 150 transmits AC power having reduced power for the harmonic frequency component to the wireless power transmitting apparatus 200 (S107).

Figure 9:
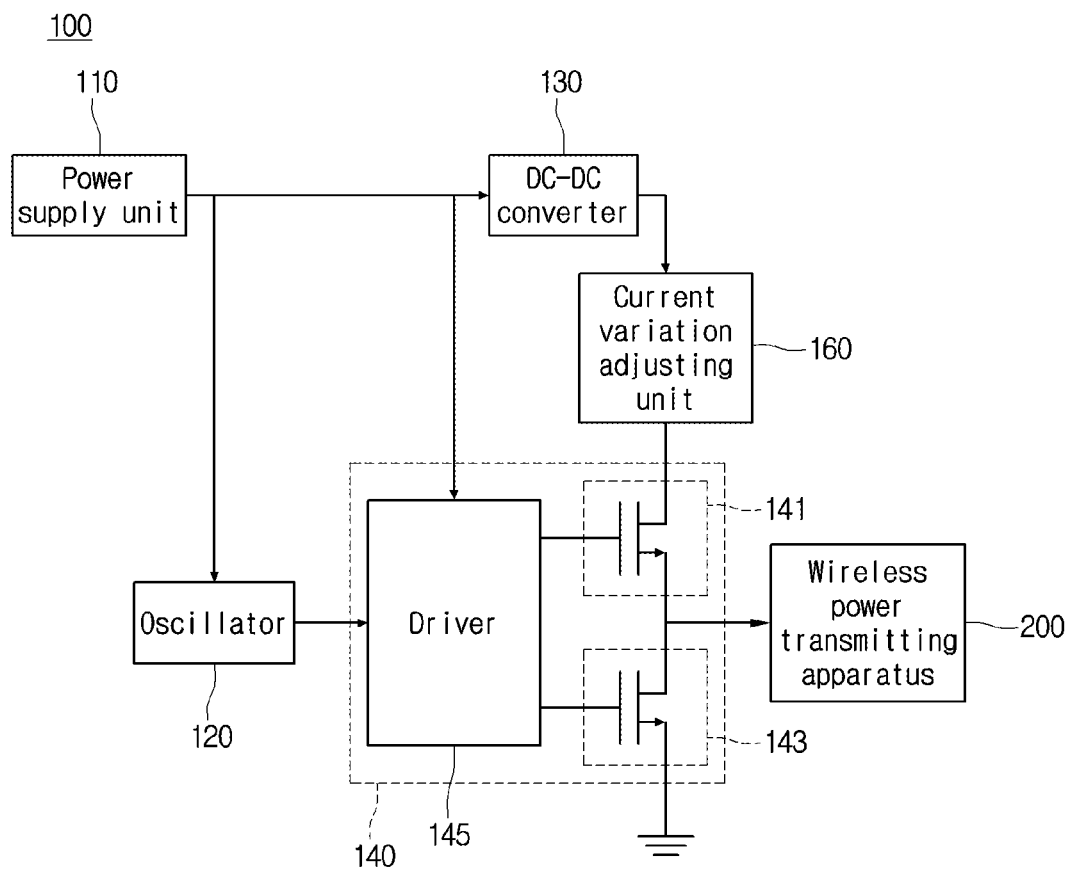
FIG. 9 is a block diagram showing the structure of the power supply device according to another embodiment of the present invention.

FIG. 9 is a block diagram showing the structure of a power supply device according to another embodiment of the present invention.

Referring to FIG. 9, a power supply device 100 according to another embodiment of the present invention may include a power supply unit 110, an oscillator 120, a DC-DC converter 130, a current variation adjusting unit 160, and an AC power generating unit 140.

Since the power supply unit 110, the oscillator 120, the DC-DC converter 130, and the AC power generating unit 140 have the same as those described with reference to FIG. 1, the details thereof will be omitted.

The current variation adjusting unit 160 may adjust the variation of DC current applied to the AC power generating unit 140. According to one embodiment, the current variation adjusting unit 160 may include an inductor.

The current variation adjusting unit 160 is interposed between the DC-DC converter 130 and the AC power generating unit 140 to adjust the variation of the DC current applied to the AC power generating unit 140.

In particular, the current variation adjusting unit 160 may prevent a quantity of the DC current applied to the AC power generating unit 140 from being rapidly changed. If the quantity of the DC current is rapidly changed, the AC current output from the AC power generating unit 140 may have an unnecessary frequency signal.

In other words, the quantity of the DC current applied to the AC power generating unit 140 (in detail, first and second MOSFETS 141 and 143) from the power supply unit 110 may be rapidly changed according to the transmission state between the wireless power transmitting apparatus and the wireless power receiving apparatus. The current variation adjusting unit 160 prevents the quantity of DC current from being rapidly changed.

When the inductor is used as the current variation adjusting unit 160, even if the quantity of current flowing through the AC power generating unit 140 is rapidly changed, a magnetic field cannot follow the quantity of current, so that current is slowly increased in proportional to applied voltage. In addition, a value corresponding to a predetermined slope refers to a self-inductance of the inductor.

The inductor may prevent the AC power signal output from the AC power generating unit 140 from having a perfect rectangular waveform, which represents that the magnitude of the AC power signal output from the AC power generating unit 140 is reduced at the harmonic frequency component among components of the AC power signal.

Therefore, the inductor reduces the magnitude of the AC power signal output from the AC power generating unit 140 at the unnecessary harmonic component among the components of the AC power signal, thereby improving the conversion efficiency when DC power is converted into AC power. Accordingly, the power transmission efficiency of the wireless power transmission system can be improved.

According to the embodiment, if the inductance of the inductor is increased, the conversion efficiency may be improved. To this end, the current variation adjusting unit 160 may include a variable inductor. The power supply device 100 may further include a control unit (not shown) to adjust the inductance of the variable inductor.

In addition, if the inductance of the inductor is increased, the harmonic frequency component and the fundamental frequency component are reduced together. In particular, the magnitude of the harmonic frequency component is more largely reduced to improve the conversion efficiency of the power supply device 100 because the magnitude of the impedance of the inductor for each frequency is $2\pi fL$, and the magnitude of the impedance is increased as the inductance is increased at a higher frequency, thereby reducing the harmonic frequency component.

Hereinafter, description will be made about the output waveform of the AC power generating unit 140 when the inductor is applied and not applied as the current variation adjusting unit 160.

FIGS. 10 to 13 are graphs to explain output waveforms of the power supply device depending on the application state of the current variation adjusting unit.

Figure 10:
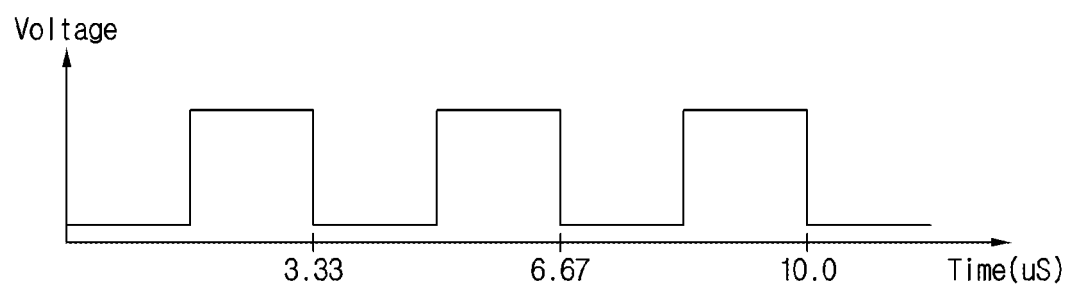
FIGS. 10 to 13 are graphs to explain output waveforms of the power supply device according to the application state of a current variation adjusting unit.
Figure 11:
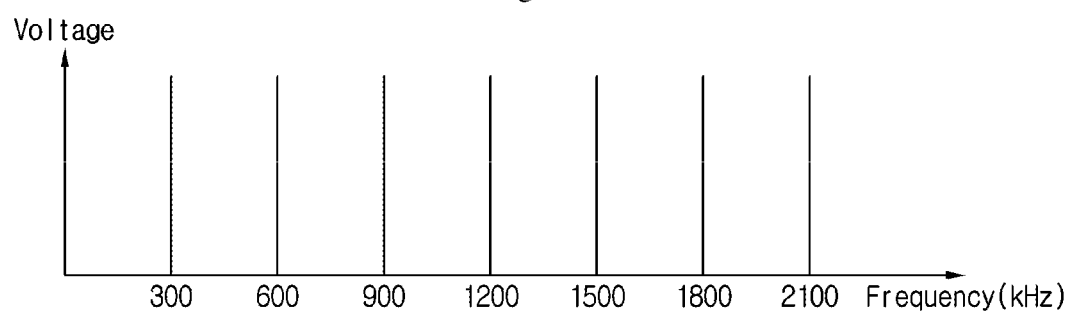
Figure 12:
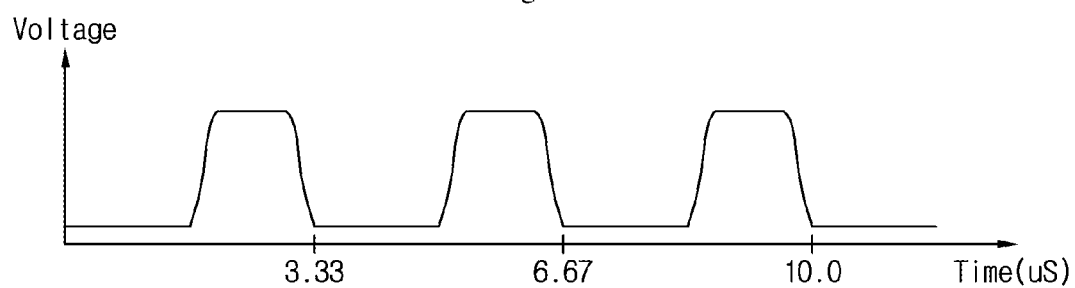
Figure 13:
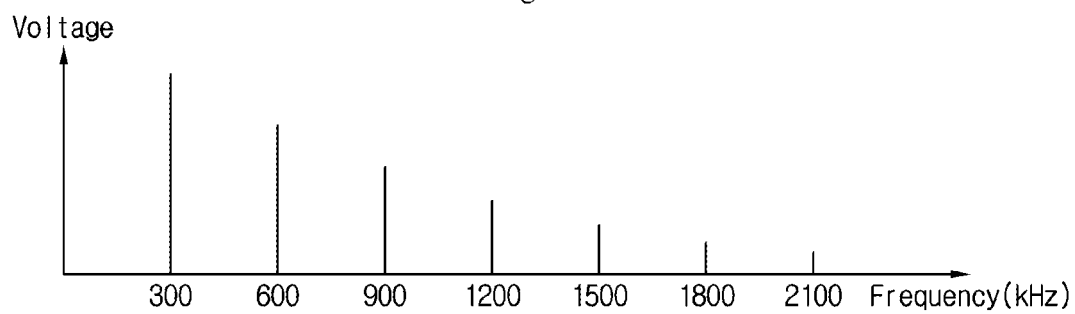

In detail, FIGS. 10 and 11 are graphs showing the output waveforms of the AC power generating unit 140 when the current variation adjusting unit 160 is not included, and FIGS. 12 and 13 are graphs showing the output waveforms of the AC power generating unit 140 when an inductor is applied as the current variation adjusting unit 160.

The fundamental frequency is assumed as 300 kHz for the illustrative purpose.

First, FIG. 10 is compared with FIG. 12.

FIGS. 10 and 12 are graphs showing the magnitude of voltage output from the AC power generating unit 140 as a function of time.

Referring to FIG. 10, the output waveform of the AC power generating unit 140 is a rectangular waveform since the AC power generating unit 140 employs a scheme in which the push-pull type of first and second MOSFETS 141 and 143 are switched.

However, as shown in FIG. 12, the output waveform of the AC power generating unit 140 is not the rectangular waveform differently from the graph of FIG. 10 since an inductor serving as the current variation adjusting unit 160 is connected with the first MOSFET 141 of the AC power generating unit 140. In other words, the output waveform has no rapidly increasing part differently from the rectangular waveform, but has a slightly slowly increasing waveform or a slightly slowly decreasing waveform.

This is because current passing through the inductor cannot be rapidly increased or decreased due to the self-inductance characteristic of the inductor. Accordingly, the output waveform of the AC power generating unit 140 has not rapidly increasing or decreasing part, but has a part in which a slope is slowly increased or decreased similarly to a curved waveform.

Next, FIG. 11 is compared with FIG. 13.

FIGS. 11 and 13 are graphs showing the magnitude of voltage output from the AC power generating unit 140 as a function of a frequency.

Figure 14:
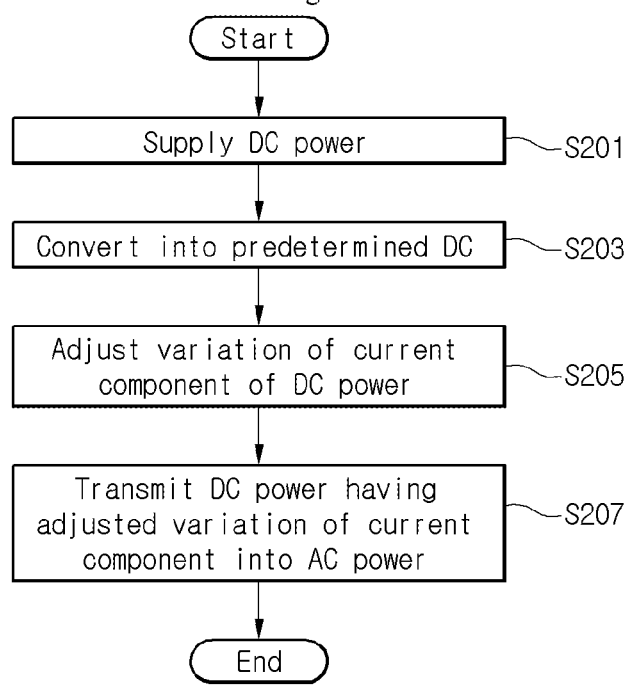
FIG. 14 is a flowchart to explain a power supply method of the power supply device according to another embodiment of the present invention.

When comparing the output waveforms of the AC power generating unit 140 with each other with reference to FIGS. 11 and 14, harmonic frequency components are more reduced in the case of FIG. 13, which is an embodiment including the current variation adjusting unit 160, rather than the case of FIG. 11 as the frequency is increased. In other words, the voltage of harmonic frequency components other than the fundamental frequency component is reduced as the frequency is increased.

The AC power signal, which is actually transmitted in power transmission, is provided with a fundamental frequency component, and harmonic frequency components are unnecessary. Accordingly, if the inductor is applied as the current variation adjusting unit 160, the harmonic frequency components are reduced in the output of the AC power generating unit 140, so that the whole power transmission efficiency can be improved.

FIG. 14 is a flowchart showing the power supply method of the power supply device according to another embodiment of the present invention.

The configuration of the power supply device 100 is the same as that described with reference to FIG. 9.

The power supply unit 110 supplies DC power to the DC-DC converter 130 (S201).

Thereafter, the DC-DC converter 130 converts DC power supplied from the power supply unit 110 into DC power having a predetermined DC voltage value (S203).

The DC-DC converter 130 converts the DC voltage applied from the power supply unit 110 into AC voltage, and then boosts up or drops down and rectifies the converted AC voltage to output DC voltage having a predetermined voltage value.

Then, the current variation adjusting unit 160 may adjust the variation of a current component of the DC power supplied to the AC power generating unit 140 (S205). In detail, the current variation adjusting unit 160 can prevent a current component of the DC power received from the DC-DC converter 130 from being rapidly increased or decreased.

When the current variation adjusting unit 160 prevents a current component of the DC power received from the DC-DC converter 130 from being rapidly increased or decreased, the harmonic frequency component of the AC power generated from the AC power generating unit 140 can be reduced.

Thereafter, the AC power generating unit 140 may convert the DC power having the adjusted variation of the current component into the AC power (S207). As described above, the AC power generating unit 140 outputs the AC power having the reduced harmonic frequency component, thereby reducing unnecessary power consumption caused by harmonic frequency component.

Figure 15:
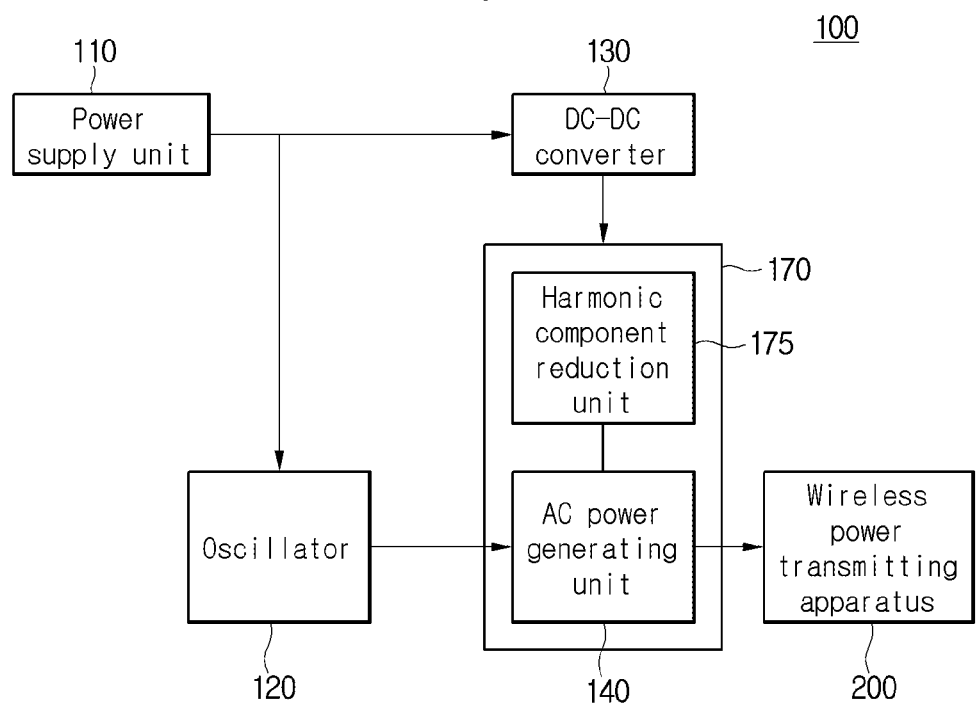
FIG. 15 is a block diagram to explain the power supply device according to another embodiment of the present invention.

FIG. 15 is a block diagram to explain a power supply device according to still another embodiment of the present invention.

Referring to FIG. 15, the power supply device according to still another embodiment of the present invention may include a power supply device 100, a power supply unit 110, an oscillator 120, a DC-DC converter 130, and an AC power supply unit 170.

Since the power supply unit 110, the oscillator 120, and the DC-DC converter 130 are the same as those described with reference to FIG. 1, the details thereof will be omitted.

The AC power supply unit 170 may include the harmonic component reduction unit 175 and the AC power generating unit 140.

The harmonic component reduction unit 175 may include at least one of the power consumption preventing unit 150 described with reference to FIG. 5 and the current variation adjusting unit 160 described with reference to FIG. 9.

The harmonic component reduction unit 175 may reduce the magnitude of power for a harmonic frequency component in power transmitted to the wireless power transmitting apparatus 200. In particular, the harmonic component reduction unit 175 may reduce the magnitude of the power for the harmonic frequency component in power supplied to the AC generating unit 140 or output from the AC power generating unit 140.

If the harmonic component reduction unit 175 includes a power consumption preventing unit 150, the power consumption preventing unit 150 can reduce the magnitude of the power for the harmonic frequency component by increasing the magnitude of an input impedance for the harmonic frequency component in AC power converted by the AC power generating unit 140. The details thereof have been described with reference to FIG. 5.

If the harmonic component reduction unit 175 includes the current variation adjusting unit 160, the current variation adjusting unit 160 can reduce the magnitude of the power for the harmonic frequency component by preventing the quantity of DC power supplied to the AC power generating unit 140 from being rapidly changing, and the details thereof have been described with reference FIG. 9.

According to the embodiment of the present invention, the power transmission efficiency can be improved by reducing the power for the harmonic frequency component in the AC power transmitted to the wireless power transmitting apparatus 200 from the power supply device 100.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A wireless power transmitter comprising:
a power supply device including a power supply unit;
an AC power generating unit to convert a DC power supplied from the power supply unit into an AC power;
a DC-DC converter to convert the DC power supplied from the power supply unit into DC power having a predetermined magnitude, and to transmit the converted DC power to the AC power generating unit;
a harmonic component reduction unit to reduce a magnitude of power for a harmonic frequency component in the generated AC power; and
a wireless power transmitting apparatus including a transmission coil unit,
wherein the harmonic component reduction unit comprises a power consumption preventing unit and a current variation adjusting unit,
wherein the power consumption preventing unit includes an inductor,
wherein the current variation adjusting unit includes an inductor,
wherein the power consumption preventing unit is arranged between the AC power generating unit and the transmission coil unit, and
wherein the current variation adjusting unit is arranged between the DC-DC converter and the AC power generating unit.

2. The wireless power transmitter according to claim 1, wherein the transmission coil unit comprises a transmission induction coil unit.

3. The wireless power transmitter according to claim 2, wherein the transmission induction coil unit comprises a capacitor and a transmission induction coil.

4. The wireless power transmitter according to claim 2, wherein the inductor of the power consumption prevention unit is arranged between the AC power generating unit and the capacitor of the transmission induction coil unit.

5. The wireless power transmitter according to claim 4, wherein the inductor of the power consumption prevention unit, the capacitor of the transmission induction coil unit, and the transmission induction coil of the transmission induction coil unit are arranged in series, and
wherein the capacitor of the transmission induction coil unit is arranged between the inductor of the power consumption prevention unit and the transmission induction coil of the transmission induction coil unit.

6. The wireless power transmitter according to claim 1, wherein the transmission coil unit includes a transmission resonance coil unit including a capacitor and a transmission resonance coil.

7. The wireless power transmitter according to claim 1, wherein the power consumption preventing unit reduces the magnitude of the power for the harmonic frequency component by increasing an input impedance measured when the wireless power transmitting apparatus is seen from the power supply device, and
wherein the harmonic component reduction unit comprises a current variation adjusting unit to reduce the magnitude of the power for the harmonic frequency component by adjusting a variation of current applied from the power supply unit to the AC power generating unit.

8. The wireless power transmitter according to claim 1, wherein the power supply device further comprises MOS- FETs to convert the DC power into the AC power and a driver to apply AC power signals having equal magnitudes and phases opposite to each other to the MOSFETs.

9. The wireless power transmitter according to claim 8, wherein the power supply device further comprises an oscillator to apply an AC power signal having a predetermined frequency to the driver.

* * * * *